(12) United States Patent
Gnaedig

(10) Patent No.: US 7,177,884 B2
(45) Date of Patent: Feb. 13, 2007

(54) METHOD, COMPUTER SYSTEM AND COMPUTER PROGRAM FOR PRODUCING DOCUMENT PROCESSING ORDERS FROM VARIABLE, PAGE-INDIVIDUAL DATA AND FROM RESOURCE DATA

(75) Inventor: Armin Gnaedig, München (DE)

(73) Assignee: Oce Printing Systems GmbH, Poing (DE)

( * ) Notice: Subject to any disclaimer, the term of this patent is extended or adjusted under 35 U.S.C. 154(b) by 185 days.

(21) Appl. No.: 10/502,828

(22) PCT Filed: Jan. 28, 2003

(86) PCT No.: PCT/EP03/00856

§ 371 (c)(1),
(2), (4) Date: Jul. 28, 2004

(87) PCT Pub. No.: WO03/065198

PCT Pub. Date: Aug. 7, 2003

(65) Prior Publication Data

US 2005/0108618 A1    May 19, 2005

(30) Foreign Application Priority Data

Jan. 31, 2002  (DE) .................... 102 03 870

(51) Int. Cl.
*G06F 12/00* (2006.01)
*G06F 17/30* (2006.01)

(52) U.S. Cl. ...................... 707/200; 715/500
(58) Field of Classification Search .............. 707/1, 707/3, 100, 200; 709/201; 715/500
See application file for complete search history.

(56) References Cited

U.S. PATENT DOCUMENTS 5,483,653 A * 1/1996 Furman .................. 707/200

(Continued)

FOREIGN PATENT DOCUMENTS

EP    0 782 068 A1    7/1997

(Continued)

OTHER PUBLICATIONS

IBM Corp., "Advanced Function Presentation, Programming Guide and Line Data Reference", 2004, pp. 126, 37-45, 65-78, 135-148, IBM Printing Systems, Boulder Colorado.

(Continued)

*Primary Examiner*—Leslie Wong
*Assistant Examiner*—Susan Rayyan
(74) *Attorney, Agent, or Firm*—Schiff Hardin LLP

(57) ABSTRACT

A method and a computer system is provided for producing a document processing order on the basis of variable, page-individual data and resource data that are applicable to a multitude of pages. Control data are contained in the document processing order and indicate which resource data are required for the document processing order. The resource data are files that are stored in at least one directory of a computer and are administered by a computer program. The computer program is used to determine the order for searching a required resource file by directory and/or by file. The directories and/or resource files are associated with freely selectable surrogate names in addition to the system names assigned in the computer. The method allows switching between a first display mode in which the resources are displayed on a display device with their surrogate names and a second display mode in which the resources are displayed on the display device with their system names.

14 Claims, 4 Drawing Sheets

U.S. PATENT DOCUMENTS

| | | | |
|---|---|---|---|
| 6,314,439 B1 * | 11/2001 | Bates et al. | 715/513 |
| 6,870,921 B1 * | 3/2005 | Elsey et al. | 379/218.01 |
| 6,917,437 B1 * | 7/2005 | Myers et al. | 358/1.15 |
| 6,978,422 B1 * | 12/2005 | Bushe et al. | 715/734 |
| 7,032,186 B1 * | 4/2006 | Gasser et al. | 715/853 |
| 2002/0194245 A1 * | 12/2002 | Simpson et al. | 709/101 |
| 2003/0093325 A1 * | 5/2003 | Robertson | 705/26 |

FOREIGN PATENT DOCUMENTS

WO     WO 02/02327 A2     1/2002

OTHER PUBLICATIONS

ISIS Papyrus Document System 5 1, Dec. 2001, pp. 1-28, ISIS Papyrus International, Internet: http://www.isis-papyrus.com.

* cited by examiner

METHOD, COMPUTER SYSTEM AND COMPUTER PROGRAM FOR PRODUCING DOCUMENT PROCESSING ORDERS FROM VARIABLE, PAGE-INDIVIDUAL DATA AND FROM RESOURCE DATA

BACKGROUND OF THE INVENTION

1. Field of the Invention

The present invention relates generally to a method, a computer system, and a computer program module for producing document processing orders from variable, page-individual data and from resource data.

2. Description of the Related Art

In document processing orders, which are sent for printing to electrographic high-performance printing systems whose print speed can be from 40 to more than 1,000 pages per minute, what are known as resource data are often used that are kept ready in special memory areas of a computer for repeated use. This procedure is suitable in particular for printing and for the electronic archiving of documents that are formed in individual page-by-page fashion, whereby the document data are put together in page-by-page fashion from resource data, e.g. data from forms, and from variable data, e.g. client-specific data from a database.

In the publication "Das Druckerbuch" [The Printer Book], by Dr. Gerd Goldmann (pub.), Océ Printing Systems GmbH, Poing, $6^{th}$ ed. (May 2001), ISBN 3-00-001019-X, Chapter 14 describes what are called Océ PrismaPro Server Systems, which are able to process the printing orders referred to above. For this purpose, various system components are provided that provide a high degree of automation in the production of a print order. Using a print job manager, print orders can be produced at an arbitrary client console in a client network, and these orders can be communicated to an order distribution system. The print job manager can thereby not only send print orders; rather, it is also possible to use a resource manager to manage various resource data, i.e., predetermined data that can be applied to a plurality of print orders. These data are produced or loaded in the print server and are stored for multiple use. Resources of this sort include for example fonts, images, logos, page segments, or overlays. The print data can thereby be stored in an electronic archive, in addition to or instead of printing.

In the production of document processing orders, what are known as job tickets can also be used, that is, data files that contain accompanying information to the document processing orders, for example for the use of resources that are already stored in a print server or an archive server.

A typical print data format for electronic production print environments in which resources are provided is the Advanced Function Presentation format (AFP). This print data format is described for example in International Business Machines Corp. (IBM) publication no. F-544-3884-01, having the title "AFP Programming Guide and Line Data Reference."

In the processing of print orders in a print production environment, it is of decisive importance to enable a processing of the print orders that is as efficient and flexible as possible, in order to achieve an effective use of the connected production printer, and thus a high degree of productivity.

In the document ISIS Papyrus Document System 5, of 1 Dec. 2001, published in the Internet at http://www.isis-papyrus.com, typical operating sequences for document processing orders in AFP environments are described.

From German Patent Application DE 693 26 789 T2, various methods are known for storing and managing resources.

SUMMARY OF THE INVENTION

The present invention enables the production of document processing orders, in which resource data are used, in as flexible a fashion as possible and with a high degree of productivity.

This is achieved by producing a document processing order from variable, page-individual data and from resource data that can be applied to a multiplicity of pages, whereby (a) the document processing order contains control data that indicate which resource data are required for the document processing order, (b) the resource data are stored as data files in at least one directory of a computer, and (c) the resource data files are managed by means of a computer program, with which (c1) the sequence for searching for a required resource by directory and/or by data file can be determined, (c2) the directories and/or resource data files can be allocated freely selectable aliases in addition to the system names assigned in the computer, and (c3) it is possible to switch between a first display mode, in which the resources are displayed on a display means with their aliases, and a second display mode in which the resource data files are displayed on the display means with their system names.

DETAILED DESCRIPTION OF THE PREFERRED EMBODIMENTS

Figure 1:
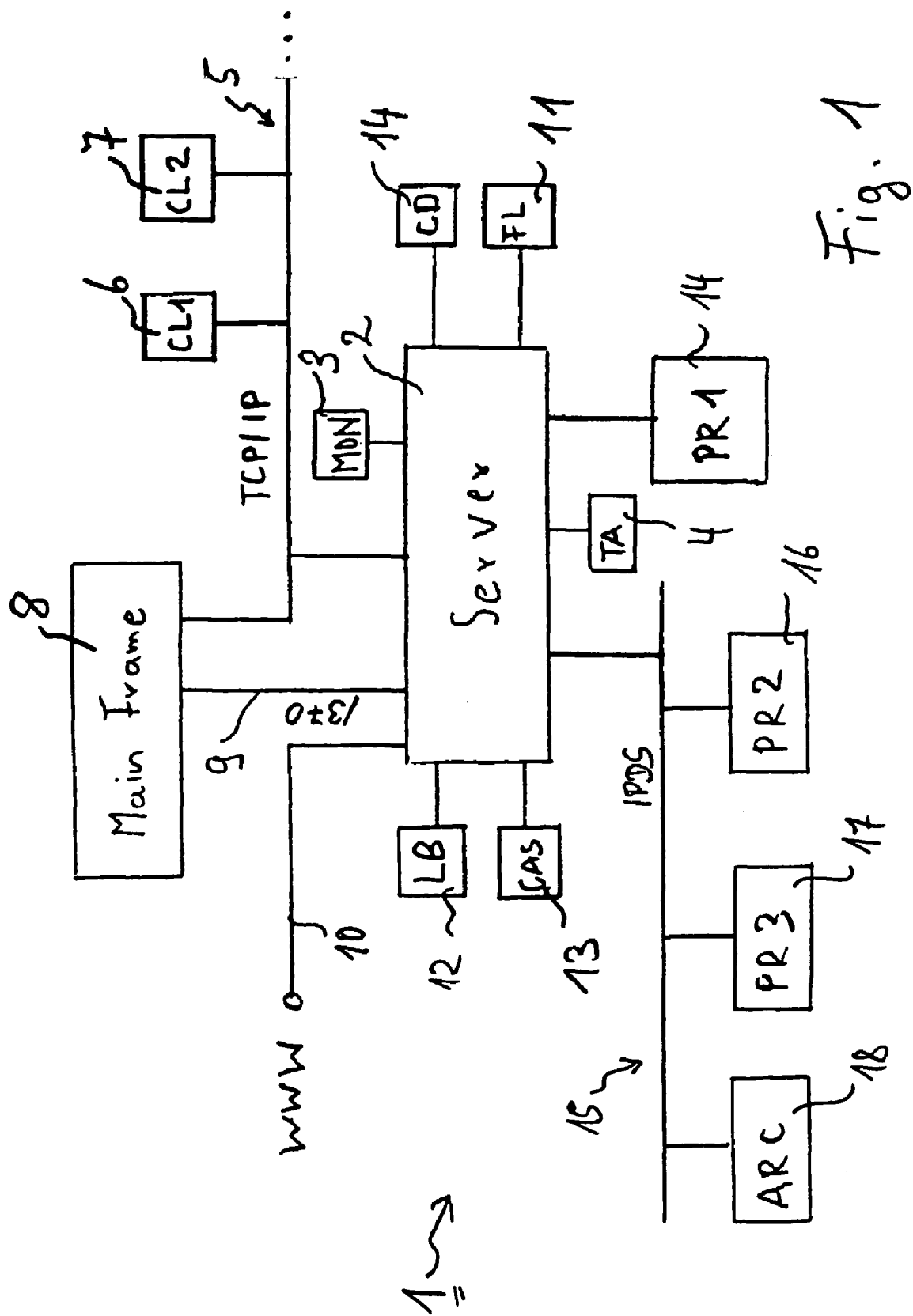
FIG. 1 is a functional block diagram of a print production system according to the principles of the present invention.

According to the present invention, for the production of a document processing order from variable, page-individual data and from resource data that can be applied to a multiplicity of pages, the document processing order contains control data that indicate which resource data are required for the document processing order. The resource data, which are stored in data files in one or more directories of a computer, are managed by means of a computer program with which the sequence can be defined for searching for a required resource by directory and/or by data file. The directories and/or resource data files can be given freely selectable aliases in addition to the system names assigned in the computer, whereby it is possible to switch between a first display mode, in which the resources are displayed on a display means with their aliases, and a second display mode in which the resource data files are displayed on the display means with their system names.

Embodiments of the present invention enable the simple and easily surveyable allocation of directories and, if necessary, all subdirectories of a directory, that are to be searched in a particular sequence for particular resources. In particular, it is thereby advantageous to assign an alias for a complete directory path, that is, for a higher-order directory including all of its subdirectories. The system names of the directories can thereby optionally be manually inputted, or can be selected from the directories in the system using a search menu.

The possibility of switching between the two display modes makes it possible on the one hand to gain a good overview of all available resources, or of all the resources allocated to a print order, by means of the allocated aliases, and on the other hand, in the second display mode, to read out the exact memory location or the exact system names allocated to the corresponding resource names on the computer system. The use of surveyable aliases additionally makes it possible for users who are less familiar with the system to carry out a correct allocation of resources to a print order. By means of the switchability of the display modes, the management program can be used both by these inexperienced users and also by system experts, who preferably use the exact system addresses of the resources.

In an advantageous specific embodiment of the present invention, the computer program displays two windows on the display means, namely an availability window, in which the resource directories and/or resource data files available in the computer are displayed, and a second window, namely a selection window, in which the resource directories and/or resource data files that have been selected for the respective document processing order are displayed. Resource directories and/or resource data files can be marked in the availability window and, by selecting a transfer menu point, can be allocated to the document processing order and displayed in the selection window.

In a further processing step, using the computer program it can be determined which data file components, in particular which end-of-file marks are used to search for resource data files of a predetermined resource type. In addition, using the selected data components it can be determined in which sequence the allocated resource data files are to be searched in order to find particular resources. In this way, in a computer system it is possible to keep a plurality of data files stored for the same resource type and to determine which resource data files are to be used on an individual order-by-order basis. This is particularly advantageous if document processing orders that must be processed repeatedly at large chronological intervals, and in which the resource data used must be exactly the same, access resource data files that in the meantime have been modified for more recent print orders. Through the use of new data filename components, these resource data files of the same type can then be allocated and used in an order-specific fashion.

For simpler management of the resource data files, it can in particular be provided to display the various resource types on the display means in such a way that it can be distinguished whether or not the associated resource data files are present in the allocated directories. For example, it can thereby be provided that resource types for which no resource data files are present are displayed as grayed out or marked with a color.

In a development of the present invention, it is provided that the selected resource directories and/or resource data files are stored, with their respective search sequences, as a profile. Such a profile can then be selected from a plurality of profiles for a subsequent document processing order.

The method according to the present invention, or systems according to the present invention, are provided in particular for application to print orders or for electronic archiving orders, but can also be used for other document processing orders, such as for example the forwarding or distribution of documents in another system, for example to various e-mail addresses.

With reference to the drawings, in a print production system 1 as shown in FIG. 1, a computer is used as a print data server 2. It is equipped with a monitor 3 and with an input means 4 (keyboard or mouse). Instead of the monitor 3, a different display means, such as for example an LCD display, an LED display, a projection device (beamer), or any other display means suitable for displaying electronically coded information, may also be used. On print data server 2, a computer program runs with which the data of print orders can be forwarded from various input channels to various output channels. At the input side, a first network 5 is provided to which various client computers 6 and 7, as well as a large computer 8 (mainframe), are connected. From large computer 8 there is also a direct data connection 9, known as a /370 channel, that is independent of network 5. In addition, print data server 2 is able to receive print orders from a wide area network (WAN), such as for example the Internet, via interface 10. In addition, print data, or optionally also resource data, can be inputted via a CD-ROM interface 14, a disk drive 11, a long tape 12, or a cassette drive 13.

In principle, the print data server 2 can process arbitrary print data in arbitrary print data languages, such as for example PostScript (PS), Page Command Language (PCL), and in particular AFP data streams. Print data, subdivided into variable data and resource data, are brought together in print data server 2 so that a complete data stream results. The resource data can thereby already be transmitted, together with the print data, to print data server 2, or, at the data source of the variable data, can be stored at a memory location provided specifically for this purpose, for example in the mainframe computer; however, they can also be supplied to print data server 2 via a different interface than the variable data. For example, variable data and order data, containing information concerning the required resources, can be communicated from network computer 6 to print server 2, whereby print server 2 determines from the transmitted order data which resources are required; searching is then carried out according to a predetermined sequence in the data file system of print server 2 and/or in a mounted data file system, i.e., in a logical data file system available in print server 2 that is however physically stored in a different computer, such as for example host computer 8.

In the print data server 2, from the variable and static data processed at the input side an output data stream is formed that is adapted to the devices connected at the output side. For print devices, for this purpose the input data streams are converted into the output print data format Intelligent Printer Data Stream (IPDS), and are transmitted at the output side for example to a first printer 14*a* or to a second network 15, to which in turn two printer devices 16 and 17, as well as an archiving device 18, are connected.

Figure 2:
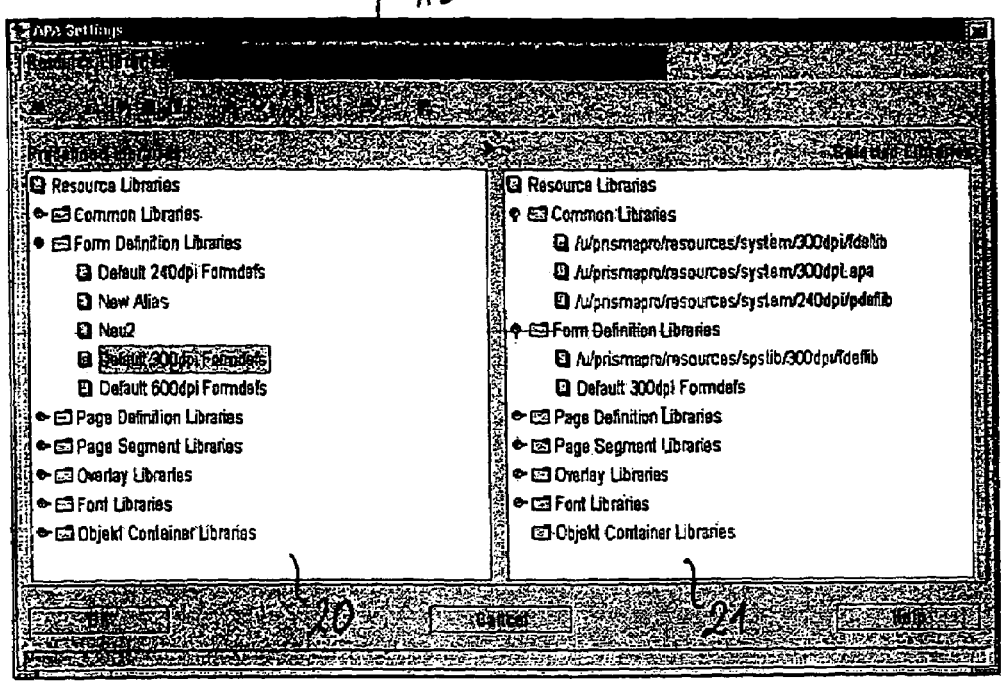
FIG. 2 is a screen shot of a user interface showing predesigned and selected libraries in the print production system.

In FIG. 2, a display window is shown that is displayed by the control program, running in print data server 2, for the management of resource data. In the center of the image, an availability window 20 and a selection window 21 are displayed. In availability window 20, only the resources that are already predefined or available in print server 2 are displayed, whereby availability window 20 is shown in the view "PREDEFINED LIBRARIES"; that is, in the view using aliases. Possible additional elements contained in the control data file of the print order, i.e., in the job ticket, are not displayed here. Inside availability window 20, in the view "predefined libraries," which displays the aliases, entries of their last use are displayed.

In the selection window 21, the elements (resources) required in the course of a print order are displayed that are contained in the control data file (job ticket) of the print order. Using the computer program that produces display menu 19, it is also checked which of the elements (resources) in the right tree in print data server 2, and which of the resource data sources that are connected to this server and available to it, are present. This check takes place on the basis of the actual system names, because no alias is stored in the job ticket data file. Elements that are stated in the loaded job ticket but that are not contained in the predefined list 20 (independent of the view selected), are checked during the loading of the job ticket data file and are then shown in cursive in selection window 21.

Figure 3:
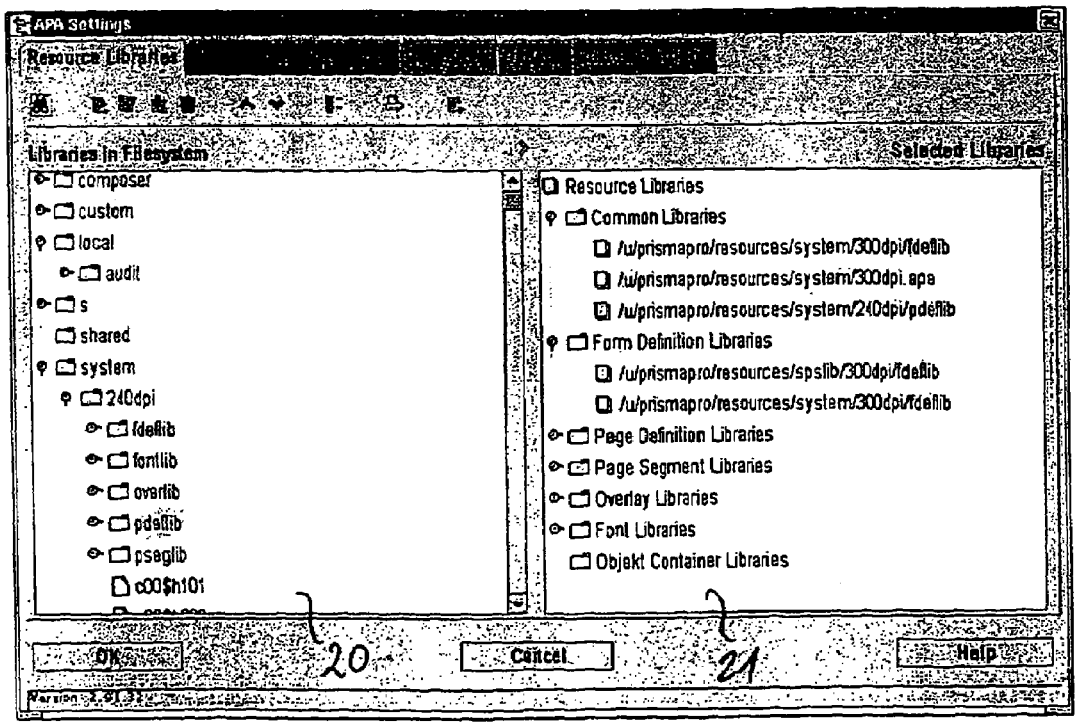
FIG. 3 is screen shot of a user interface showing libraries in a data file structure, as well as selected libraries in the print production system.

FIG. 3 shows the availability window 20 in the view "LIBRARIES IN FILESYSTEM"; i.e., the directories or data file names in the system names assigned by print server 2. All available resources of print data server 2 are thereby shown in availability window 20 in the display mode of the actual system names. The view is sorted alphabetically and shows all system paths coming from a higher-order resource path.

Figure 4:
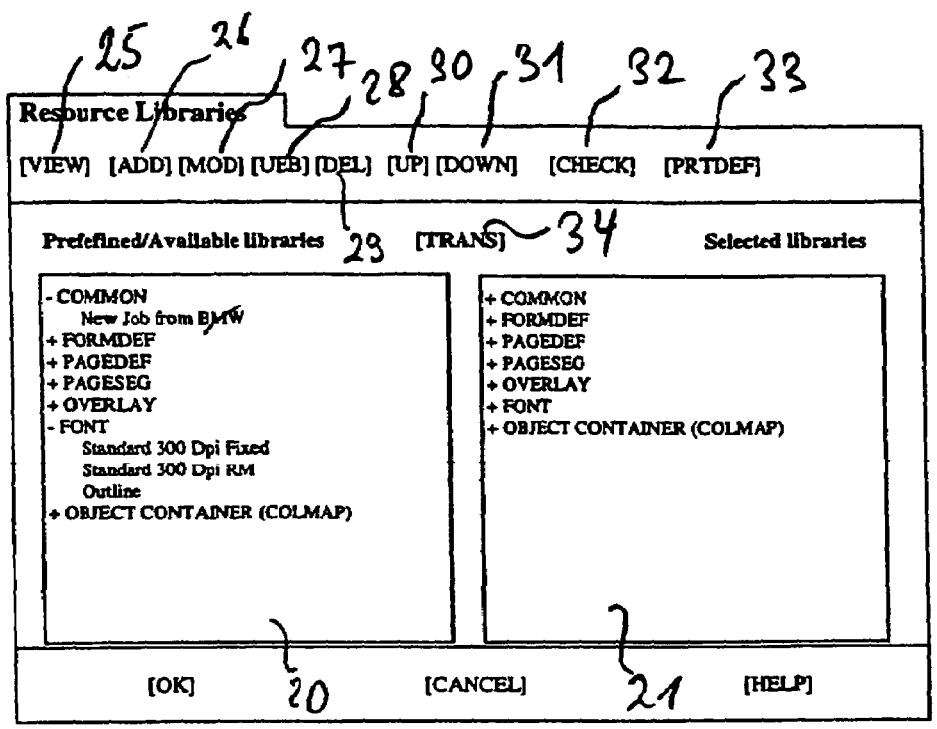
FIG. 4 is a user interface showing available and selected libraries in the print production system.

In FIG. 4, the windows of FIGS. 2 and 3 are again shown schematically. In the availability window 20, the resources are indicated with aliases COMMON (with subdirectory NewJob), FORMDEF, PAGEDEF, PAGESEG, OVERLAY, FONT (with subdirectories), and OBJECT CONTAINER. By actuating button 25 (VIEW), it is possible to switch between the display of the aliases in availability window 20 (see FIG. 2) and the display of the corresponding stored system paths or system data files. With button 26, in the mode that uses aliases additional resources can be incorporated into the list of the predefined resources. It is thereby possible to allocate to each alias a system paths alone, a system path with all its subdirectories, and/or individual system data files. Using button 27 (MOD), it is possible to modify entries in the job ticket data file. This button is available only if an element has been selected in selection window 20 (Predefined View). If this element is also present in selection window 21, its name is modified analogously to the modification in availability window 20. If an element in selection window 21 is selected, using button 28 it is possible to search for the corresponding element in selection window 20 under the same system path as the element of selection window 21.

Using buttons 30 and 31 (UP, DOWN), resources inside Windows 20 and 21 can be shifted upward or downward, and can thus be modified with respect to the sequence according to which the processing of the print order searches for resources in the corresponding resource directories or resource data files.

By actuating button 32, a check is carried out as to whether the resources shown in availability window 20 and in selection window 21 exist. Nonexistent entries are thereby marked in red without changing the typeface of the entries. During the check, the displayed resources are checked in the same sequence in which they are searched in the later further processing (printing). Thus, the system paths displayed for this resource type are searched with the data file components (extensions) specified for the resource type. The first finding of the element is then displayed. Using button 29, DEL, one or more resource elements can be selected and deleted, even across two boundaries. Before the resource is actually deleted, a query is made: "Are you sure you want to delete the selected entries?" This is to be answered either with OK or Cancel.

Using button 33, PRTDEF, for a print order it can be determined whether there exists a resource source that should be used in the device (printer) for the further processing (PRTDEF on), or whether such resources should be ignored (PRTDEF off).

Using button TRANS 34, resources present in selection window 21 are copied to the resources that are available in the print server and that are displayed in availability window 20. The resources are thereby automatically entered into an appropriate [or: matching] directory of selection window 21.

Figure 5:
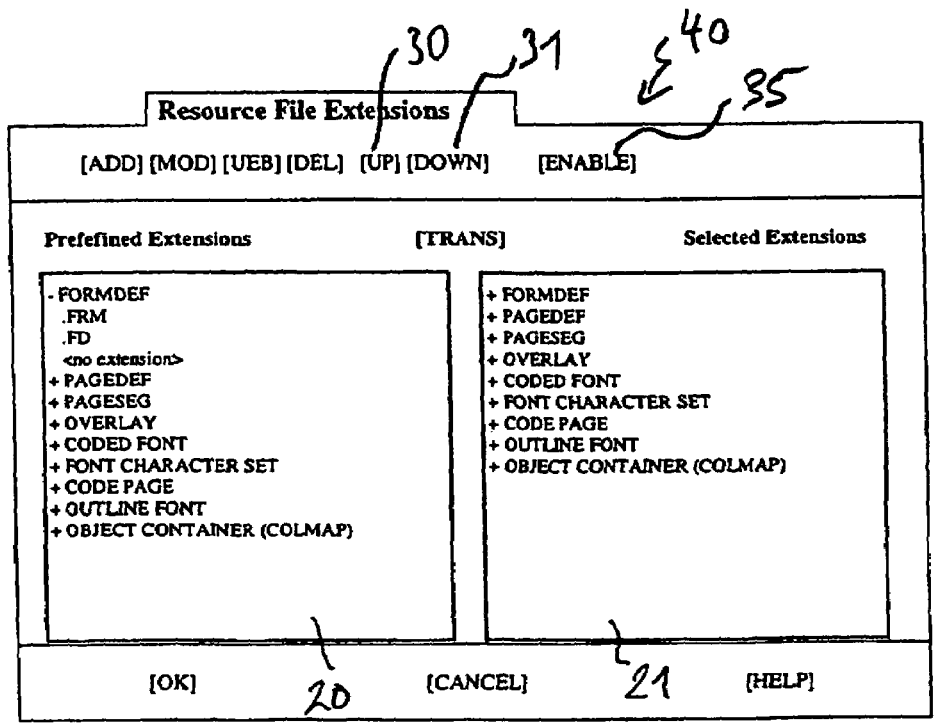
FIG. 5 is a user interface showing a selection menu for predefined and selected data file ends for print production system.

FIG. 5 shows a setting window 40, with which extensions of data filenames can be allocated. In availability window 20, data file extensions are thereby indicated, for example under the resource "FORMDEF," in the sequence .FRM, .FD, <no extension>. This has the result that during the searching of the resources under "FORMDEF," first those data files having the ending .FRM are searched, and then data files having the ending .FD are searched, and finally FORMDEF data files without a "." ending are searched for resources.

Using buttons 30 UP and 31 DOWN, marked data file designations can be shifted upward or downward, so that the sequence of searching is changed.

Using button ENABLE 35, it is possible to generally suppress the use of data file extensions, so that their influence on the search sequence is also suppressed. Upon actuation of the ENABLE button 35, the displays in availability window 20 and in selection window 21 are shown in grayed-out fashion, so that the deactivation of the data file endings can be immediately recognized visually. In display window 40, "Resource File Extensions," there is no button for switching the view from aliases to actual system names or system paths.

Figure 6:
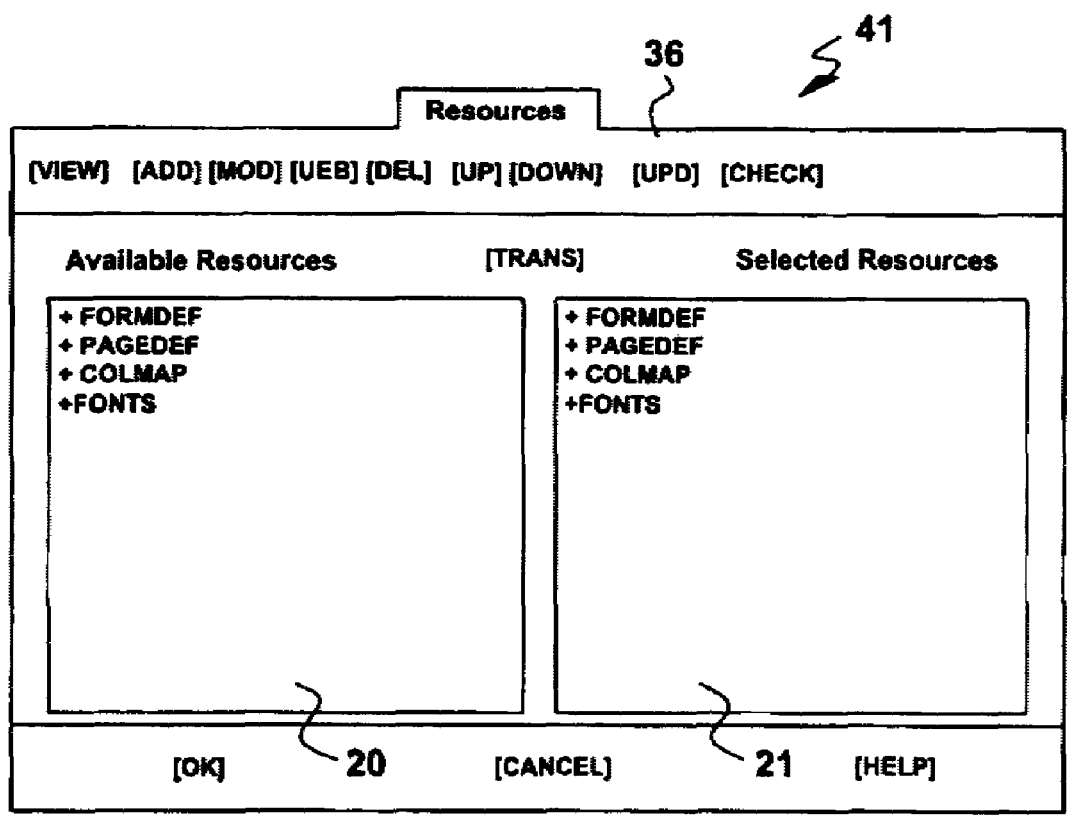
FIG. 6 is a user interface showing a selection menu for available and selected resource data files in the print production system.

In FIG. 6, a display window 41 is shown with which available resources are shown in availability window 20 and selected resources are shown in selection window 21. The entries correspond to the resources found on the system in the resource libraries of FIGS. 2, 3, and 4, taking into account the data file extensions of FIG. 5. By actuating button UPD 36, the available resources are automatically updated if a modification has been carried out in one of the other, previously cited windows.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A method for producing a document processing order from variable, page-individual data and from resource data that is applied to a multiplicity of pages, comprising the steps of:
   providing the document processing order having control data that indicate which resource data are required for the document processing order, said resource data including predetermined data that is capable of being applied to a plurality of print orders;
   storing the resource data as data files in at least one directory of a computer; and managing the resource data files by a computer program, including the substeps of:
    determining a sequence for searching for a required resource by at least one of directory and data file;
    allocating freely selectable aliases to at least one of directories and resource data files in addition to system names assigned in the computer; and
    accepting a selection so as to effect a switch between a first display mode, in which resources are displayed on a display with their aliases, and a second display mode in which the resource data files are displayed on the display means with their system names.

2. A method as recited in claim 1, further comprising the steps of:
    displaying an availability window by the computer program on the display;
    showing at least one of resource directories and resource data files available in the computer; and
    showing at least one of resource directories and resource data files selected for the document processing order in a selection window on the display.

3. A method as recited in claim 1, further comprising the steps of:
    marking at least one of resource directories and resource data files in the availability window;
    allocating the marked directories or files to the document processing order by selecting a transfer key; and
    showing the transferred directories or files in the selection window.

4. A method as recited in claim 1, further comprising the steps of:
    using a computer program to determine which data file components are used for searching for resource data files of a predetermined resource type.

5. A method as recited in claim 1, further comprising the steps of:
    using the selected data file components to determine a sequence in which the allocated resource data files are searched.

6. A method as recited in claim 1, wherein a display of resource types on the display takes place in such a way that it can be distinguished whether associated resource data files are present or are not present in the allocated directories.

7. A method as recited in claim 6, wherein resource types for which no resource data files are present are displayed in grayed-out fashion.

8. A method as recited in claim 1, further comprising the steps of
    storing at least one of selected resource directories and resource data files with their respective search sequences as a profile.

9. A method according to claim 8, further comprising the steps of:
    selecting a profile from a plurality of previously produced profiles in order to produce a subsequent document processing order.

10. A method as recited in claim 1, wherein the document processing order is a print order.

11. A method as recited in claim 1, wherein the document processing order is an archiving order.

12. A computer for producing document processing orders from variable, page-individual data and from resource data that is applied to a multiplicity of pages, the computer being programmed to perform the steps of:
    a document processing order contains control data that indicate which resource data are required for the document processing order, said resource data including predetermined data that is capable of being applied to a plurality of print orders,
    the resource data are stored as data files in at least one directory of the computer, and the resource data files are managed using a computer program that runs on the computer, including the substeps of:
        the sequence being determined for searching for a required resource by at least one of directory and by data file,
        at least one of the directories and resource data files being allocated freely selectable aliases in addition to the system names assigned in the computer, and
        being swithable between a first display mode, in which the resources are displayed on a display with their aliases, and a second display mode in which the resource data files are displayed on the display with their system names.

13. A computer as claimed in claim 12, wherein said computer includes a server on which a computer program is installed that executes the recited steps.

14. A computer program for producing document processing orders from variable, page-individual data and from resource data that is applied to a multiplicity of pages on a computer the computer program being executable on a computer to perform the steps of:
    a document processing order contains control data that indicate which resource data are required for the document processing order;
    the resource data are stored as data files in at least one directory of the computer, the resource data including predetermined data that is capable of being applied to a plurality of print orders; and
    the resource data files are managed by the computer program, including the substeps of:
        the sequence being determined for searching for a required resource by at least one of directory and data file;
        at least one of the directories and resource data files being allocated freely selectable aliases in addition to the system names assigned in the computer; and
        being switchable between a first display mode, in which the resources are displayed on a display with their aliases, and a second display mode in which the resource data files are displayed on the display with their system names.

* * * * *